3,376,266
POLYURETHANES PRODUCED FROM
1,2-DIVINYL ETHYLENE GLYCOL
Erhard F. Hoegger and James Herbert Werntz, Wilmington, Del., assignors to E. I. du Pont de Nemours and Company, Wilmington, Del., a corporation of Delaware
No Drawing. Filed Mar. 2, 1964, Ser. No. 348,752
5 Claims. (Cl. 260—77.5)

ABSTRACT OF THE DISCLOSURE

Tough, film-forming polyurethanes produced from 1,2-divinyl ethylene glycol, and optionally a saturated aliphatic glycol, and arylene diisocyanates. The process of preparing the above polymers by reacting the monomers at a temperature between 0° C. and 100° C. for a time sufficient to obtain a polymer of film-forming molecular weight.

---

This invention relates to new nonelastomeric polyurethanes and more particularly to non-elastomeric polyurethanes having pendant vinyl groups.

The preparation of film-forming, essentially linear, polyurethanes with pendant vinyl side chains is a very difficult task. Where bis-chloroformates and diols are the starting materials, there are problems with the removal of largt amounts of hydrogen chloride. The reaction of diisocyanates and diols often lead to low molecular weight and/or branched polymers because of side reactions. The presence in this invention of vinyl groups to produce tough, non-elastomeric films further exaggerates the problem of avoiding side reactions since isocyanate groups can react with vinyl groups. For example, it is known that vinyl isocyanate reacts with itself to give polyamides.

Diisocyanates have been reacted with polymeric glycols having vinyl side groups. However, this only circumvents the problem by having present very few isocyanate groups with which the vinyl groups could react. Also the polymer has very few urethane linkages

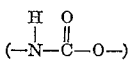

per total weight, thus rending it elastomeric and incapable of forming tough films.

It is therefore an object of this invention to prepare tough, stiff film-forming polyurethanes having vinyl side chains. It is a further object to prepare film-forming polyurethanes having a high percentage of urethane linkages per total weight of polymer. It is a still further object to provide a method for the preparation of these polyurethanes. Other objects will appear hereinafter.

These objects have been surprisingly accomplished by the polymers of this invention, which are polyurethanes consisting essentially of the recurring structural units

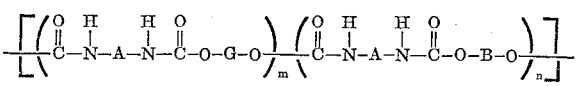

wherein —O—G—O— is a bivalent radical obtained by removing the hydroxyl hydrogen atoms from 1,2-divinyl ethylene glycol; —O—B—O— is a bivalent radical obtained by removing the hydroxyl hydrogen atoms from a saturated aliphatic glycol; A is an arylene radical;

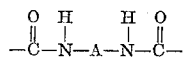

is a bivalent radical resulting from the addition of a hydrogen atom to the nitrogen atom of each of the isocyanate groups of an arylene diisocyanate; $m$ is an integer greater than zero; $n$ is an integer including zero; and the —O—G—O— radicals being 80 to 100 percent of the total of the —O—G—O— and —O—B—O— radicals present in said polyurethanes.

The preparation of these polyurethanes comprises reacting 1,2-divinyl ethylene glycol and a saturated aliphatic glycol with a substantially equimolar amount of an arylene diisocyanate, wherein the said 1,2-divinyl ethylene glycol is 80–100 molar percent of the total glycol being reacted. However, the preparation may be carried out by any one of several process variations: (a) glycol(s), alone or in solution, may be added to the diisocyanate solution; (b) glycol(s) and diisocyanate can be added simultaneously to a solvent; (c) both the glycol(s) and diisocyanate in solution can be added simultaneously; (d) glycol(s) in solution and diisocyanate not in solution can be added simultaneously; (e) glycol(s) not in solution and diisocyanate in solution can be added simultaneously; (f) diisocyanate solution may be added to the glycol(s), alone or in solution; etc. Since it is desirable to protect diisocyanate from atmospheric moisture, it is preferred that the diisocyanate be in solution.

Any of the arylene diisocyanates, i.e., those in which each of the two isocyanate groups is attached directly to an aromatic ring, may be employed. Representative arylene nuclei for the diisocyanate are phenylene, naphthylene, biphenylene, anthrylene, fluorenylene ($C_{13}H_8$) and benzfurylene. Examples of operable diisocyanates are m- and p-phenylene diisocyanate;

2,4-toluene diisocyanate;
dianisidine diisocyanate (4,4'-dimethoxy-3,3'-diisocyanatobiphenyl);
4,4'-biphenylene diisocyanate;
1,5-naphthylene diisocyanate;
1,8-naphthylene diisocyanate;
bis(4-isocyanatophenyl) methane;
bis(4-isocyanatophenyl) ethane;
cumene-2,4-diisocyanate;
4-methoxy-1,3-phenylene diisocyanate;
4-phenoxy-1,3-phenylene diisocyanate;
4-ethoxy-1,3-phenylene diisocyanate;
2,4'-diisocyanato diphenyl ether;
4,4'-diisocyanato diphenyl ether;
5,6-dimethyl-1,3-phenylene diisocyanate;
2,4-dimethyl-1,3-phenylene diisocyanate;
benzidine diisocyanate (4,4'-diisocyanato biphenyl);
4,6-dimethyl-1,3-phenylene diisocyanate;
1,6-anthracene diisocyanate;
2,7-anthracene diisocyanate;
3,3'-dimethyl-4,4'-diisocyanato biphenyl;
3,3'-dimethoxy-4,4'-diisocyanato biphenyl;
2,5-fluorene diisocyanate;
4,4'-diisocyanato diphenyl methane; and
2,6-diisocyanato benzfurane.

The preferred diisocyanate is selected from the group consisting of:

m- and p-phenylene diisocyanate;
2,4-toluene diisocyanate;
bis(4-isocyanatophenyl)methane;
bis(4-isocyanato-phenyl)ethane;
cumene-2,4-diisocyanate;
4-methoxy-1,3-phenylene diisocyanate;
4-phenoxy-1,3-phenylene diisocyanate;
2,4'-diisocyanato diphenyl ether;
4,4'-diisocyanato diphenyl ether;

5,6-dimethyl-1,3-phenylene diisocyanate;
4,4'-diisocyanato diphenyl methane;
2,4-dimethyl-1,3-phenylene diisocyanate; and
2,5-fluorene diisocyanate.

While 1,2-divinyl ethylene glycol provides the essentially linear polyurethane with the pendant vinyl groups, up to 20 molar percent of the total glycol may be a saturated monomeric aliphatic glycol, as hereinbefore described, without substantially affecting the high quality of the film. The preferred saturated monomeric aliphatic glycols are ethylene glycol, propylene glycol and neopentyl glycol. Another preferred embodiment of this invention is to have 1,2-divinyl ethylene glycol as the only glycol present.

In carrying out the preparation of these film-forming polyurethanes, it is desirable to react substantially equimolar proportions of reactants, i.e., equimolar proportions of hydroxyl groups to isocyanate groups, at a temperature of from about 0 to 100° C. for about ½ to 6 hours or until substantially all isocyanate and hydroxyl groups have reacted. Substantially equimolar proportions, i.e., less than about 5 mole percent excess of either reactant, are used to obtain the high molecular weight polymers desired and to protect against hydrolysis of any free, unreacted isocyanate groups by the moisture in the air. A temperature range of 0–100° C. is desired since the reaction rate becomes too slow below 0° C. to be very useful, and above 100° C. undesirable side reactions become intolerably competitive. The higher the temperature the faster the reaction rate. Catalysts, such as dibutyltin dilaurate, may also be used to aid the reaction. A preferred temperature range from an economic standpoint is about 50–95° C. Where higher temperatures are used, leading to some side reaction and some low molecular weight polymers, the polymer may be purified by reprecipitation. However, within the desired temperature range, such reprecipitation is not critical. It is necessary, for high-quality polymers, that the reaction be carried out under substantially anhydrous conditions to prevent hydrolysis of the diisocyanate to form urea groups. Common solvents may be used such as tetrachloroethane, chlorobenzene, pyridine or mixtures thereof.

The reaction is always carried far enough to make the polymer film-forming, i.e., the number of recurring structural units is sufficient to give a polymer having an inherent viscosity of at least 0.1 and preferably 0.3. Inherent viscosity, which is directly related to the molecular weight of the polymer, is defined by L. H. Cragg in The Journal of Colloid Science, volume I, pages 261–9 (May 1946) as: Inherent viscosity=(ln relative viscosity)/C, where relative viscosity is the ratio of the solution viscosity to the solvent viscosity, and C is the concentration of solute in solution measured as grams of polymer per 100 milliliters of solution. In the subsequent examples, the inherent viscosity is measured and reported as an 0.5% solution by weight of the polymer at 30° C. in dimethylformamide solvent.

The following examples are merely intended to be illustrative of the nature of the present invention:

EXAMPLE I

A solution of 5 grams (0.02 mole) of 4,4'-diisocyanato diphenyl methane (DDMDI) in 5 milliliters of chlorobenzene and 5 milliliters of sym-tetrachloroethane is added at room temperature to a solution of 2.24 grams (0.02 mole) of 1,2-divinyl ethylene glycol (DVG) in 10 milliliters of sym-tetrachloroethane containing 3 drops of dibutyltin dilaurate catalyst. The temperature is raised to 95° C. for 1.5 hours under constant stirring. Portions of the viscous polymer solution (inherent viscosity greater than 0.3) are cast directly onto flat surfaces and tough films are obtained on drying. From other portions the polymer is precipitated by mixing with petroleum ether and purified by dissolution and reprecipitation. The best films are cast from a 10%–20% solids solution (by weight) in cyclohexanone of the reprecipitated polymer, some properties of which are given below:

Inherent viscosity (0.5% in dimethylformamide, 30° C.) _____ 0.65.
Thickness (mils) _____ 0.44.
Initial modulus (at 1% elongation) __ 270K p.s.i.
Elongation at break _____ 3%.
Tensile strength _____ 7.1K p.s.i.
Tear strength _____ 6.8 g./2" tear/ml.
X-ray crystallinity _____ Amorphorus.
Dielectric constant (23° C.):
  At $10^2$ c.p.s. _____ 4.46
  At $10^5$ c.p.s. _____ 4.20
Dissipation Factor (23° C.):
  At $10^2$ c.p.s. _____ 0.022
  At $10^5$ c.p.s. _____ 0.015

Soluble in acetone, cyclohexanone, pyridine.
Insoluble in ether, petroleum ether, toluene.
Reacts readily with chlorine or bromine vapors with loss of vinyl bands in IR (infra-red).

EXAMPLE II

Polymer of fair quality (inherent viscosity 0.3) is obtained by adding, with stirring, equal quantities of a 2.0 molar solution of 1,2-divinyl ethylene glycol in absolute pyridine and a 2.0 molar solution of 4,4'-diisocyanato diphenyl methane in absolute pyridine. The temperature rises to 54° C. during reaction. The mixture is allowed to stand for one hour and, from this polymer solution, tough films are prepared by casting, drying and washing.

EXAMPLE III

Ethylene glycol is substituted for 20 molar percent of the 1,2-divinyl ethylene glycol in the procedure of Example I. Tough films are cast from the resulting polymer. Likewise, when propylene glycol and neopentyl glycol, respectively, are substituted for 20 molar percent of the 1,2-divinyl ethylene glycol in Example I, the corresponding tough films are obtained.

EXAMPLE IV

When each of the following diisocyanates is substituted in the procedure of Example I in equimolar amounts for the diisocyanate used therein, the corresponding tough film is obtained in each case: m-phenylene diisocyanate; p-phenylene diisocyanate; 2,4-toluene diisocyanate; bis(4-isocyanatophenyl)methane; bis(4-isocyanatophenyl) ethane; cumene-2,4-diisocyanate; 4-methoxy-1,3-phenylene diisocyanate; 4-phenoxy-1,3-phenylene diisocyanate; 2,4'-diisocyanato diphenyl ether; 4,4'-diisocyanato diphenyl ether; 5,6-dimethyl-1,3-phenylene diisocyanate; 4,4'-diisocyanato diphenyl methane; 2,4-dimethyl-1,3-phenylene diisocyanate; and 2,5-fluorene diisocyanate.

Thus is can be seen that the polyurethanes of this invention possess excellent film-forming properties. The films may be cast from these polyurethanes as in Example I above or by other prior art processes. These stiff, tough films are useful for various applications, especially for wrapping and tapes. As seen in Example I, the Initial Modulus (at 1% elongation) is several orders of magnitude higher than the value for elastomers.

These advantages have been made possible by the unexpected result that the hydroxyl groups of 1,2-divinyl ethylene glycol will react with the isocyanate groups of arylene diisocyanate without having an intolerable amount of side reaction between the vinyl groups and the isocyanate groups. This enables polyurethanes to be formed from monomeric glycol, leading to a higher percentage of urethane linkages

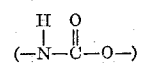

per total weight of polymer than can be produced from polymeric glycols.

Various changes and modifications may be made in this invention without departing from the spirit or scope thereof as defined in the following claims.

What is claimed is:

1. Polyurethanes having an inherent viscosity of at least 0.1 consisting essentially of the recurring structural units

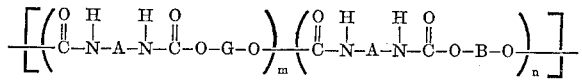

wherein —O—G—O— is a bivalent radical obtained by removing the hydroxyl hydrogen atoms from 1,2-divinyl ethylene glycol: —O—B—O— is a bivalent radical obtained by removing the hydroxyl hydrogen atoms from a saturated aliphatic glycol; A is an arylene radical; $m$ is an integer greater than zero; $n$ is an integer including zero; and the —O—G—O— radicals being 80 to 100 percent of the total of the —O—G—O— and —O—B—O— radicals present in said polyurethanes.

2. The polyurethanes of claim 1, said —O—G—O— radicals being 100 percent of the total of —O—G—O— and —O—B—O— radicals present.

3. The polyurethanes of claim 1 having an inherent viscosity of at least 0.3.

4. The polyurethanes of claim 1 wherein said A is an arylene radical obtained by removing the isocyanate groups from a member selected from the group consisting of m-phenylene diisocyanate; p-phenylene diisocyanate; 2,4-toluene diisocyanate; bis(4-isocyanatophenyl) methane; bis(4-isocyanatophenyl)ethane; cumene-2,4-diisocyanate; 4-methoxy-1,3-phenylene diisocyanate; 4-phenoxy-1,3-phenylene diisocyanate; 2,4′ - diisocyanato diphenyl ether; 4,4′-diisocyanato diphenyl ether; 5,6-dimethyl-1,3-phenylene diisocyanate; 4,4′-diisocyanato diphenyl methane; 2,4-dimethyl-1,3-phenylene diisocyanate; and 2,5-fluorene diisocyanate.

5. The polyurethanes of claim 1 wherein said —O—B—O— is a bivalent radical obtained by removing the hydroxyl hydrogen atoms from a saturated aliphatic glycol selected from the group consisting of ethylene glycol, propylene glycol and neopentyl glycol.

References Cited

UNITED STATES PATENTS

| | | | |
|---|---|---|---|
| 2,929,800 | 3/1960 | Hill | 260—77.5 |
| 2,511,544 | 6/1960 | Rinke et al. | 260—77.5 |
| 3,100,759 | 8/1963 | Boussu et al. | 260—77.5 |
| 3,219,633 | 11/1965 | Boussu et al. | 260—75 |

DONALD E. CZAJA, *Primary Examiner.*

F. McKELVEY, *Assistant Examiner.*